Feb. 25, 1941. C. H. STUTZNER 2,233,064

BAKING MOLD

Filed Sept. 12, 1939

INVENTOR
CHARLES H. STUTZNER
BY
ATTORNEYS

Patented Feb. 25, 1941

2,233,064

UNITED STATES PATENT OFFICE 2,233,064

BAKING MOLD

Charles H. Stutzner, White Plains, N. Y.

Application September 12, 1939, Serial No. 294,441

8 Claims. (Cl. 53—6)

In the baking of pies and particularly those in which the filler is of a more or less thin consistency likely to penetrate and be absorbed by the dough forming the bottom crust so as to render the latter soggy, it is desirable to pre-bake the lower crust, and this invention relates to devices for the pre-baking of pie-crusts, and has for its object to provide a mold consisting of two parts between which the dough may be baked to an even thickness throughout and to an exact size and shape without any shrinkage or other deformation.

Another object of my invention is to provide a simple and inexpensive adjustable clamp for holding the two parts of the mold at a predetermined distance apart so as to regulate the thickness of the crust to the desired extent.

Other objects and advantages of my invention will be apparent from the following description of it taken in connection with the annexed drawing in which.

Figure 1:
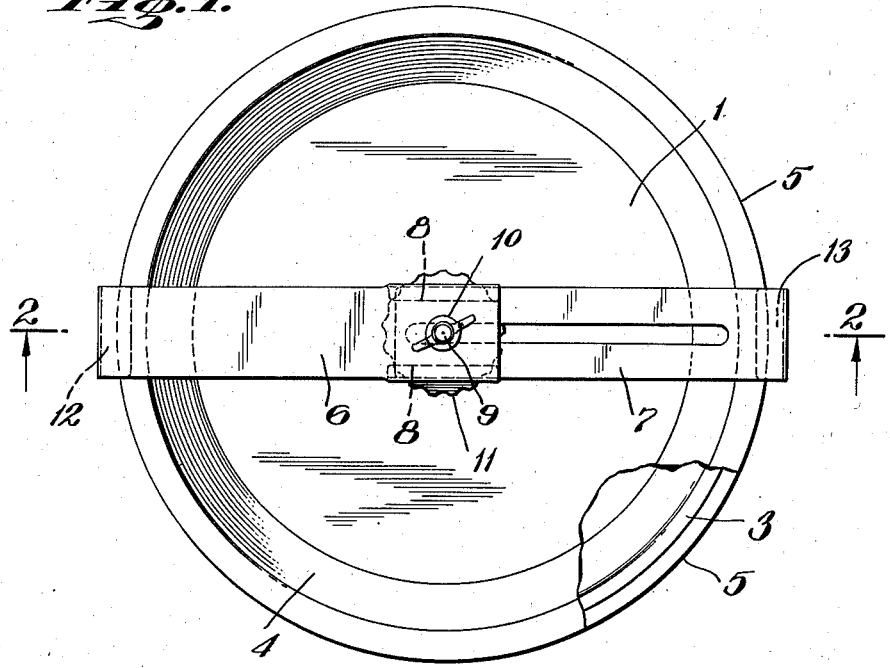
Fig. 1 is a plan view of the device.
Figure 2:
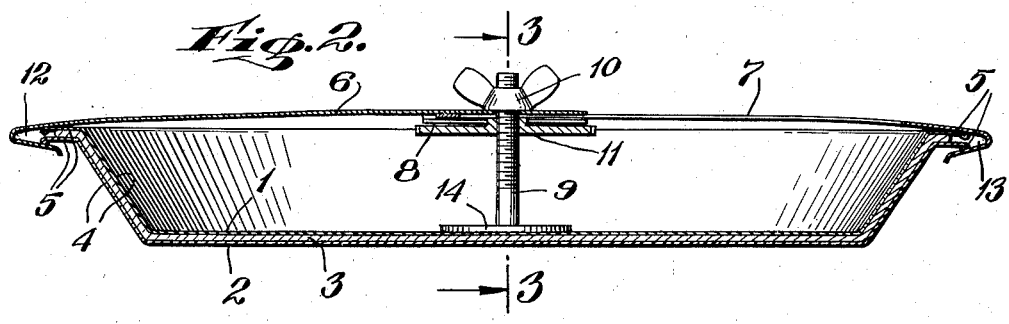
Fig. 2 is a sectional view on the line 2—2 of Fig. 1.
Figure 3:
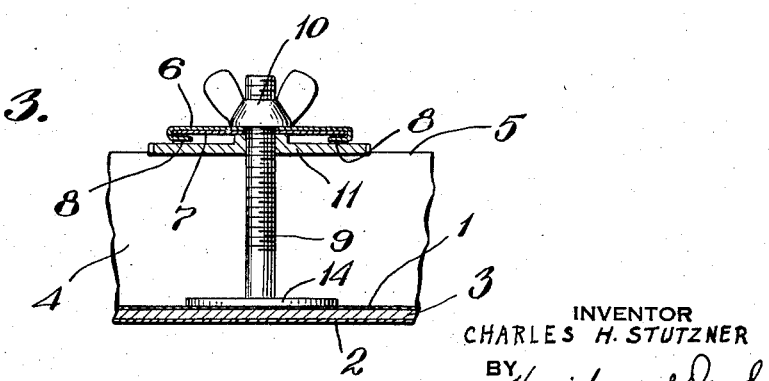
Fig. 3 is a sectional fragmentary view on the line 3—3 of Fig. 2.

Referring to the drawing, 1 and 2 represent upper and lower sections, respectively, of the mold formed, preferably, of stiff sheet metal, and 3 is a layer of dough therebetween. Since the bottom crust of a double crust pie or the single crust of what is known as an open faced pie conforms to the shape of a pie plate, the upper and lower sections 1 and 2 of the said mold each conform to that pattern and are preferably circular in shape, having horizontal bottoms, and oblique sides 4 terminating in horizontal peripheral flanges 5. The upper section 1 is preferably slightly smaller than the lower section 2 in order that when positioned apart from each other the cross sectional distance between them will be substantially equal at all points, but since the variation between pie crusts, from the thinnest to the thickest of those used, is not very great, the lack of equality in the distance between the oblique sides of the two sections and that between the horizontal bottom and peripheral flanges, if the oblique sides are formed at an angle not substantially more than 45 degrees to the horizontal, will be insubstantial in view of the limits of vertical displacement of the two sections required for the range of thickness of pie crusts ordinarily used. A pair of ordinary metal pie plates of the same size and shape may therefore be used for sections 1 and 2 of the mold.

After the dough is rolled to the desired thickness it is placed between the two sections of the mold which are then fastened and held together by a bridge clamp extending diametrically across the mold.

This bridge clamp is made preferably of stiff metal and consists of two members 6 and 7 adapted to slide upon each other. The member 6 towards its inside end portion is turned over and around member 7 as at 8 to provide a guide for said member 7 which is slotted for a distance from its inner end to pass the threaded post 9 extending through a hole in the member 6. The wing-nut 10 on the threaded post 9 cooperating with the spacing nut 11 (hereafter described) serves to lock the two members of the bridge clamp at any desired length. The outer ends of said members 6 and 7 are each bent over to form tapered openings 12 and 13 adapted to receive and hold therein the flanges 5 of the two sections of the mold and to define the limit to which the two sections of the mold may be forced apart, thereby to define the thickness of the dough and the crust formed therefrom.

In other words, where the two members 6 and 7 are brought together and locked in a position so that the flanges of the two sections of the mold extend all the way into the tapered openings 12 and 13 there will be little or no allowable space between the two sections of the mold, whereas if the two members of the clamp are locked in a more extended position, the greater height of the tapered openings where they will contact the edges of the flanges 5 permits a greater separation of the two sections of the mold, thus defining a dough or crust of greater thickness. The threaded post 9 is formed with a footed portion 14 to engage the outer surface of section 1 of said mold at its center and by means of the spacing nut 11 the depth of the said foot from the said bridge clamp may be regulated. One of the purposes of this is to provide a bracing means whereby when the two sections of the mold have been placed in position with the dough between them and the bridge clamp adjusted to its proper length with the flanges in the tapered openings, the entire assembly may be locked in a rigid unit by turning up the spacing nut 11 against the underside of the bridge clamp to a point where substantial pressure is exerted upon the mold and bridge clamp in accordance with the desired thickness of the dough, and then turning down tightly the wing-nut 10. Another advantage is that where the two sections of the mold are composed of ordinary metal pie plates the pressure of the foot 14 on the outer surface of section 1 of the mold at the center thereof overcomes any tendency of it to bulge or give under the pressure of a possibly greater thickness of the dough at what will be the bottom of the pie crust, and will cooperate with the tapered openings in the clamp to preserve an even thickness of the dough throughout.

In operation, the dough may be rolled in the ordinary way to substantially the desired thickness and placed in the section 2 which should be placed upon a supporting surface such as a table. Section 1 of the mold is then pressed down upon it concentrically with said section 2. The bridge clamp is then placed in position upon the mold and adjusted to its proper length so that the flanges 5 extend into the tapered openings 12 and 13 the required distance in accordance with the desired thickness of the dough, and the foot 14 is then adjusted by means of the spacing nut 11 to its proper distance beneath the bridge clamp to level out any excess thickness of the dough and to hold the bridge clamp rigidly in position, whereupon the wing-nut 10 is turned down tightly to lock the two members of the bridge clamp, whereby the two sections of the mold, with the dough in an even layer between them, will be held in a rigid assembly which may be then placed in the oven for baking, preferably with the wing-nut 10 or upper end of the threaded post 9 resting on the oven floor so that the heat may be evenly distributed about the top and bottom of the mold.

It is obvious that changes may be made in the device shown and described without departing from the spirit of the invention.

What I claim is:

1. A baking mold of the class described comprising upper and lower sections each provided with peripheral flange portions whereby said sections may be held complementary to each other, a bridge clamp extending across said mold provided at its outer ends with tapered openings adapted to receive said flange portions and means for varying the length of said bridge clamp thereby adjustably to limit the extent of separation between said upper and lower sections.

2. A baking mold of the class described comprising upper and lower sections each provided with peripheral flange portions whereby said sections may be held complementary to each other, a bridge clamp extending across said mold provided at its outer ends with tapered openings adapted to receive said flange portions and bracing means between said bridge clamp and one of said mold sections.

3. A baking mold of the class described comprising upper and lower sections each provided with peripheral flange portions whereby said sections may be held complementary to each other, a bridge clamp extending across said mold provided at its outer ends with tapered openings adapted to receive said flange portions, means for varying the length of said bridge clamp thereby adjustably to limit the extent of separation between said upper and lower sections, and bracing means between said bridge clamp and one of said mold sections.

4. A baking mold of the class described comprising upper and lower sections each provided with peripheral flange portions whereby said sections may be held complementary to each other, a bridge clamp consisting of a pair of relatively adjustable members each provided at one end with a tapered opening adapted to receive said flange portions, a hole in one of said members and a longitudinal slot in said other member, a threaded post extending through said hole and slot to engage the outer surface of one section of said mold, a pair of nuts on said post located on opposite sides of said bridge clamp whereby to adjust the length of said post between said bridge clamp and said mold section and to lock said bridge clamp members together.

5. A clamp adapted to extend across and hold a pair of pie plates of substantially the same size and shape positioned one within the other with a layer of dough of selected thickness between them, said pie plates being provided with peripheral flanges, which clamp is characterized in that it is provided at its outer ends with tapered openings adapted to receive said flange portions and is provided with means for varying its length thereby to adjustably limit the extent of separation between said pie plates.

6. A clamp adapted to extend across and hold a pair of pie plates of substantially the same size and shape, positioned one within the other with a layer of dough of selected thickness between them, said pie plates being provided with peripheral flanges, which clamp is characterized in that it is provided at its outer ends with tapered openings adapted to receive said flange portions and is provided with bracing means adapted to engage one of said pie plates at a point within and substantially remote from the periphery of said pie plate.

7. A clamp adapted to extend across and hold a pair of pie plates of substantially the same size and shape positioned one within the other with a layer of dough of selected thickness between them, said pie plates being provided with peripheral flanges, which clamp is characterized in that it is provided at its outer ends with tapered openings adapted to receive said flange portions and is provided with means for varying its length, thereby to adjustably limit the extent of separation between said pie plates, and with bracing means adapted to engage one of said pie plates at a point within and substantially remote from the periphery of said pie plate.

8. A clamp adapted to extend across and hold a pair of pie plates of substantially the same size and shape positioned one within the other with a layer of dough of selected thickness between them, said pie plates being provided with peripheral flanges, which clamp comprises a pair of relatively adjustable members each provided at one end with a tapered opening adapted to receive said flange portions, a hole in one of said members and a longitudinal slot in said other member, a threaded post extending through said hole and slot to engage the surface of one of said pie plates, a pair of nuts on said post located on opposite sides of said clamp whereby to adjust the length of said post between said bridge clamp and said pie plate and to lock said clamp members together.

CHARLES H. STUTZNER.